United States Patent
Usui (10) Patent No.: US 7,719,860 B2
(45) Date of Patent: May 18, 2010

(54) POWER SUPPLY AND ITS CONTROLLING METHOD

(75) Inventor: Hiroshi Usui, Saitama (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/541,710

(22) PCT Filed: Jun. 11, 2004

(86) PCT No.: PCT/JP2004/008225

§ 371 (c)(1),
(2), (4) Date: Jul. 8, 2005

(87) PCT Pub. No.: WO2005/006527

PCT Pub. Date: Jan. 20, 2005

(65) Prior Publication Data

US 2006/0098462 A1    May 11, 2006

(30) Foreign Application Priority Data

Jul. 15, 2003   (JP) .............................. 2003-274894

(51) Int. Cl.
*H02M 3/335*  (2006.01)
(52) U.S. Cl. .............. 363/21.12; 363/21.15; 363/21.16; 363/21.18; 363/49
(58) Field of Classification Search .............. 363/21.12, 363/21.15, 21.16, 21.18, 21.17, 49, 50
See application file for complete search history.

(56) References Cited

U.S. PATENT DOCUMENTS

| 5,793,621 | A * | 8/1998 | Yamada ...................... 315/411 |
| 6,714,425 | B2 * | 3/2004 | Yamada et al. ........... 363/21.12 |
| 2002/0145888 | A1 * | 10/2002 | Yoshinaga et al. ....... 363/21.15 |
| 2005/0201123 | A1 * | 9/2005 | Usui et al. .................... 363/16 |

FOREIGN PATENT DOCUMENTS

| EP | 1160984 A2 | 12/2001 |
| JP | 02-294287 A | 12/1990 |
| JP | 2000-023461 A | 1/2000 |
| JP | 2000-228873 A | 8/2000 |
| JP | 2003-052174 A | 2/2003 |
| JP | 2003-164150 A | 6/2003 |

\* cited by examiner

*Primary Examiner*—Bao Q Vu
*Assistant Examiner*—Nguyen Tran
(74) *Attorney, Agent, or Firm*—Townsend and Townsend and Crew LLP (57) ABSTRACT

When an AC power supply (9) is powered up, a constant current supply section (14) supplies a constant current to a capacitor (C3) to charge the capacitor (C3). When a voltage across the capacitor (C3) becomes equal to or greater than a predetermined voltage, a switch control section (17) sets a switch (13) off. When an output current drops to lead to a light load, a load detecting circuit (15) stops the operation of a PWM control circuit (12) and activates a timer (16). The timer (16) supplies a switch-ON signal to the switch control section (17) when it is activated and a predetermined time measured elapses. When supplied with the switch-ON signal, the switch control section (17) sets the switch (13) on. When the switch (13) is set on, the capacitor (C3) is charged again, applying a voltage to the PWM control circuit (12).

9 Claims, 9 Drawing Sheets

POWER SUPPLY AND ITS CONTROLLING METHOD

TECHNICAL FIELD

The present invention relates to a power supply which can reduce power consumption while standing by to be ready to return to a normal operation state, and its controlling method.

BACKGROUND ART

There is a case where some of electronic devices are standing by to be ready to return to the normal operation state. In such a standby state, power is hardly consumed. There is a case where a power supply which supplies power to an electronic device as a load should be stopped if power is not consumed, from viewpoints of reduction in power consumption and noise.

Such a power supply, which determines that a loadless state has come when the current to be supplied to a load becomes smaller, and stops supplying the input voltage to achieve low power consumption, is disclosed in, for example, Unexamined Japanese Patent Application KOKAI Publication No. H2-294267.

If the power supply is not activated, however, the current does not flow in the load, which is the same as the loadless state. Once such a conventional power supply goes into a standby state, therefore, the power supply will never be activated unless an activation signal to activate the power supply is supplied from outside. In other words, the conventional power supply should be supplied with the activation signal from outside, and such a method cannot be adapted to one which cannot be supplied with the activation signal from outside.

DISCLOSURE OF INVENTION

PROBLEMS TO BE SOLVED BY THE INVENTION

The present invention has been made in view of the conventional problems, and aims at providing a power supply which can start its operation from a standby state without a signal supplied from outside.

MEANS FOR SOLVING THE PROBLEMS

To achieve the object, a power supply according to the invention comprises:

a voltage generating section which generates an output voltage to be supplied to a load;

a drive control section which, when supplied with a drive control voltage necessary for generating a drive signal, generates the drive signal in accordance with a signal indicating magnitude of the output voltage, supplies the generated drive signal to the voltage generating section to drive and control the voltage generating section; and a drive-control voltage supply section which, when activated, applies the drive control voltage to the drive control section to activate said drive control section, stops applying the drive control voltage to said drive control section to stop the drive control section when an output current to be supplied to the load becomes less than a preset current value, and drives the drive control section by applying the drive control voltage after a predetermined time elapses since stopping of the drive control section.

The voltage generating section may comprise:

a transformer having a primary winding and a secondary winding;

a DC voltage input section which receives a DC voltage and applies the input DC voltage to the primary winding of the transformer;

a switching section which generates a voltage on the primary winding of the transformer by switching a current flowing in the primary winding of the transformer, and a rectifying and smoothing section which rectifies and smoothes a voltage generated on the secondary winding of the transformer, and supplies that voltage to the load, whereby the drive control section supplies a pulse signal for the switching section to switch the current to the switching section as the drive signal, thereby driving and controlling the switching section.

The transformer may have a third winding, and the drive-control voltage supply section may comprise:

a capacitor which applies a charged voltage to the drive control section as the drive control voltage;

a charge circuit section which supplies a current to the capacitor from the DC voltage input section of the voltage generating section to charge the capacitor when the DC voltage input section starts inputting a DC voltage to the primary winding of the transformer, an auxiliary power supply section which rectifies a voltage generated on the third winding of the transformer and applies that voltage to the capacitor to charge the capacitor;

a charge control section which stops charging of the capacitor from the charge circuit section when the drive control voltage to be supplied to the drive control section becomes equal to or greater than a preset voltage value;

an operation stop section which detects an output current to be supplied to the load, compares a current value of the detected output current with the preset current value, and stops an operation of the drive control section when the current value of the detected output current becomes less than the preset current value; and a time measuring section which measures a time after the operation stop section stops the operation of the drive control section, and causes the charge control section to resume charging the capacitor when a preset time elapses since measuring.

The charge circuit section may be constituted by inserting, between the DC voltage input section and one end of the capacitor:

a constant current supply section which supplies a constant current to the capacitor; and a switch which is closed at a time of activation when the DC voltage input section starts inputting the DC voltage.

The charge circuit section may be constituted by inserting, between the DC voltage input section and one end of the capacitor:

a resistor, and a switch which is closed at a time of activation when the DC voltage input section starts inputting the DC voltage.

The charge control section may comprise a switch control section which stops charging of the capacitor from the charge circuit section, and the time measuring section may be so constituted as to measure a time after the operation stop section stops the operation of the drive control section, and output a switch-ON signal to close the switch to the switch control section when a preset time elapses since measuring, thereby resuming charging of the capacitor.

A resistor may be connected to both ends of the capacitor, and the time measuring section may consider that the preset time has elapsed when a voltage across the capacitor becomes equal to or lower than a predetermined value after the operation stop section has stopped the operation of the drive control section, and cause the switch control section to resume charging of the capacitor.

The transformer may have a third winding, and the drive-control voltage supply section may comprise:

a capacitor which applies a charged voltage to the drive control section as the drive control voltage;

a charge circuit section which supplies a current to the capacitor from the DC voltage input section of the voltage generating section to charge the capacitor;

an auxiliary power supply section which rectifies a voltage generated on the third winding of the transformer and applies that voltage to the capacitor to charge the capacitor, an operation stop section which detects an output current to be supplied to the load, compares a current value of the detected output current with the preset current value, and stops an operation of the drive control section when the current value of the detected output current becomes less than the preset current value;

a discharge control section which discharges a voltage of the capacitor when a discharge instruction signal is supplied; and a time measuring section which supplies the discharge instruction signal to the discharge control section when the operation stop section stops an operation of the drive control section, and stops supplying the discharge instruction signal to the discharge control section when a preset time elapses after time measuring.

The charge circuit section may comprise a current supply section which supplies a current to the capacitor, and the discharge control section may comprise:

a switch which is open at a time of activation when the DC voltage input section starts inputting the DC voltage; and a switch control section which closes the switch to discharge the voltage of the capacitor, when the operation stop section stops the operation of the drive control section.

The charge circuit section may comprise a resistor inserted between the DC voltage input section and the capacitor, and the discharge control section may comprise:

a switch which is open at a time of activation when the DC voltage input section starts inputting the DC voltage; and a switch control section which closes the switch to discharge the voltage of the capacitor, when the operation stop section stops the operation of the drive control section.

To achieve the object, a drive method for a power supply according to the invention is a controlling method for a power supply including a voltage generating section which operates when a drive control signal is supplied thereto, generates an output voltage to be supplied to a load in accordance with a signal indicating magnitude of the output voltage, and a drive control section which generates the drive control signal from a drive control voltage and supplies the generated drive control signal to the voltage generating section to drive the voltage generating section to supply the output voltage to the load, wherein when the power supply is activated, the drive control voltage is applied to the drive control section to supply the voltage to the load from the voltage generating section, a current flowing in the load is monitored, application of the drive control voltage to the drive control section is stopped to stop an operation of the drive control section when the current becomes less than a preset current value, and after a predetermined time elapses since stopping, supply of the drive control voltage to the drive control section is started again to operate the drive control section.

EFFECT OF THE INVENTION

The invention can provide a power supply which can start its operation from a standby state without a signal supplied from outside.

EXPLANATION OF REFERENCE NUMERALS

1 converter
2 AC-DC converting section
3 voltage converting section
4 rectifying and smoothing section
5 output voltage detecting section
6 control section
7 auxiliary power supply section
8 drive-control voltage supply section
9 AC power supply
11 rectifying Circuit
12 PWM control circuit
13 switch
14 constant current supply section
15 load detecting circuit
16 timer
17 switch control section
21 comparator
22 inverter
T transformer
n1 primary winding
n2 secondary winding
n3 third winding
D11 photodiode
Q12 phototransistor
Pout1 output terminal
Pout2 output terminal

BEST MODE FOR CARRYING OUT THE INVENTION

Power supplies according to embodiments of the invention will now be described with reference to the accompanying drawings. In the embodiments of the invention, a power supply will be described as a converter.

First Embodiment

Figure 1:
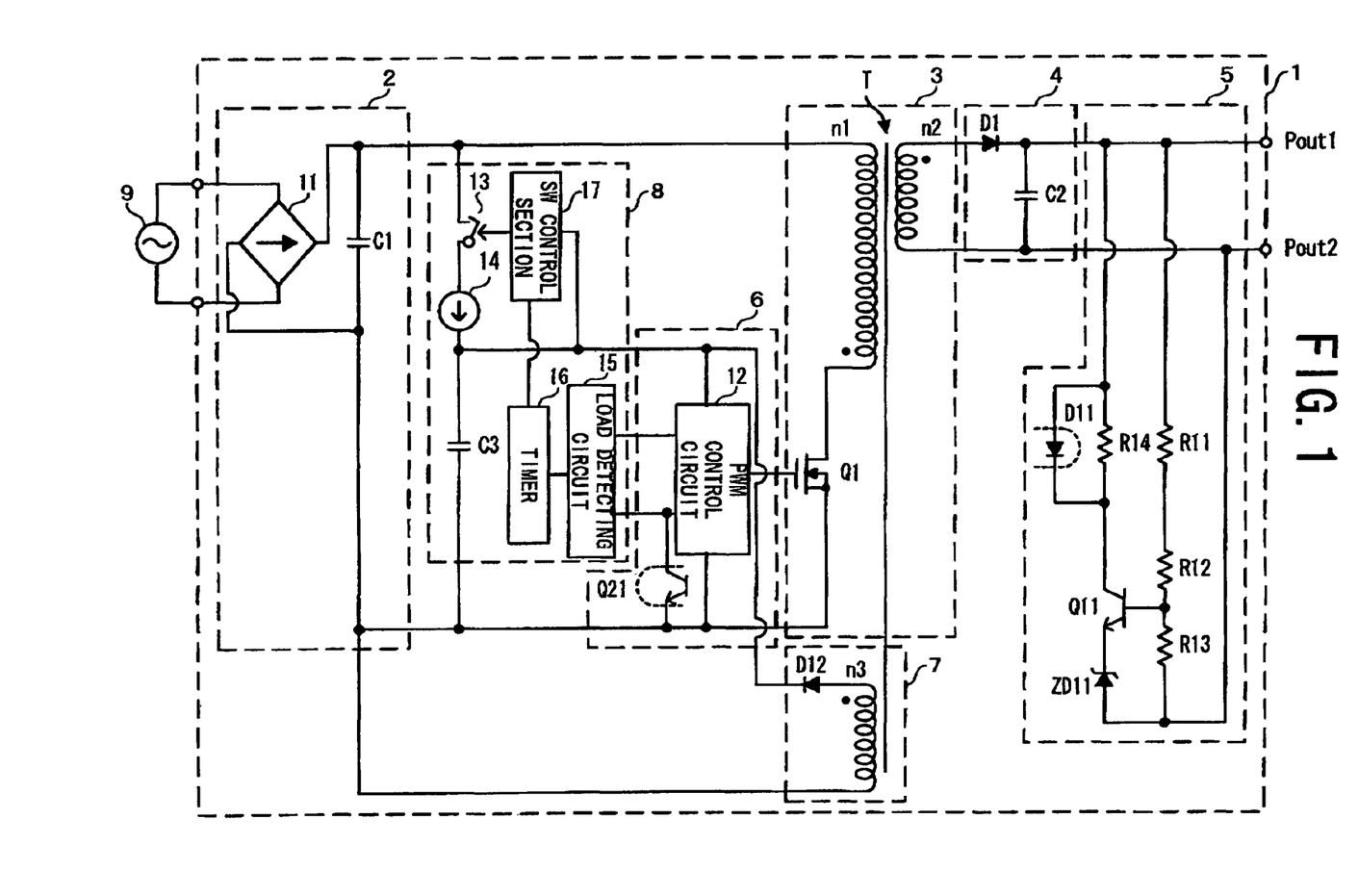
FIG. 1 is a circuit diagram showing the structure of a converter according to a first embodiment of the invention.

FIG. 1 shows the structure of a converter according to the first embodiment.

A converter 1 according to the first embodiment is constituted by a flyback converter, and comprises an AC-DC converting section 2, a voltage converting section 3, a rectifying and smoothing section 4, an output voltage detecting section 5, a control section 6, an auxiliary power supply section 7 and a drive-control voltage supply section 8.

The AC-DC converting section 2, the voltage converting section 3 and the rectifying and smoothing section 4 generate a voltage to be supplied to a load, and the AC-DC converting section 2 receives an AC voltage and applies a rectified and smoothed DC voltage to a primary winding n1 of the transformer T. AC power from an AC power supply 9 is converted to DC power. The AC-DC converting section 2 includes a rectifying circuit 11 and a capacitor C1.

The rectifying circuit 11 is constituted by a bridge rectifying circuit comprising four diodes (not shown), and performs full-wave rectification of AC power supplied from the AC power supply 9 connected to two input terminals.

The capacitor C1 smoothes a voltage according to pulsating AC power rectified by the rectifying circuit 11. One end of the capacitor C1 is connected to one output terminal (+) of the rectifying circuit 11, and the other end is connected to the other output terminal (−) of the rectifying circuit 11.

The voltage converting section 3, which performs voltage conversion, comprises the transformer T and a transistor Q1.

The transformer T has the primary winding n1, a secondary winding n2, and a third winding n3, and performs voltage conversion of an AC voltage between the primary winding n1 and the secondary winding n2. One end of the primary winding n1 is connected to one end of the capacitor C1.

The transistor Q1 is a switching transistor which is turned on or off according to a pulse signal supplied to its gate, and corresponds to a switching section. The transistor Q1 comprises an N channel field effect transistor (FET). The drain of the transistor Q1 is connected to the other end of the transformer T, the source is connected to the other end of the capacitor C1, and the gate is connected to a PWM control circuit 12 of the control section 6.

The rectifying and smoothing section 4, which rectifies and smoothes an AC voltage generated across the secondary winding n2 of the transformer T, comprises a diode D1 and a capacitor C2. The diode D1 rectifies the voltage generated across the secondary winding n2 of the transformer T, and the capacitor C2 smoothes the voltage rectified by the diode D1. The primary winding n1 and the secondary winding n2 are wound around the transformer T in such a way that energy is stored in the transformer T when the transistor Q1 is turned on and the energy stored in the transformer T is discharged in an OFF period.

The output voltage detecting section 5, which detects the output voltage, comprises a photodiode D11, a transistor Q11, a Zener diode ZD11 and resistors R11 to R14.

One end of the resistor R11 is connected to an output terminal Pout1, and one end of the resistor R12 is connected to the other end of the resistor R11. One end of the resistor R13 is connected to the other end of the resistor R12, and the other end of the resistor R13 is connected to an output terminal Pout2.

The photodiode D11 and a phototransistor Q21 of the control section 6 constitute a photocoupler. The use of the photocoupler can insulate the primary side from the secondary side. The photodiode D11 emits light with the amount of emission corresponding to the current flowing thereto. The anode of the photodiode D11 and one end of the resistor R14 are connected to the output terminal Pout1.

The transistor Q11 is constituted by an NPN bipolar transistor. The transistor Q11 and the Zener diode ZD11 serve to control the current that flows in the Zener diode ZD11 based on the output voltage. The collector of the transistor Q11 is connected to the cathode of the photodiode D11 and the other end of the resistor R14, and the base is connected to the node between the resistors R12 and R13. The cathode of the Zener diode ZD11 is connected to the emitter of the transistor Q11, and the anode is connected to the output terminal Pout2.

The control section 6 generates a pulse signal as a drive signal to drive the transistor Q1 when applied with a drive control voltage. The control section 6 controls the pulse width (PWM control) of the pulse signal in such a way that the output voltage detected by the output voltage detecting section 5 becomes a preset voltage. Then, the control section 6 supplies the generated pulse signal as the drive signal to the gate of the transistor Q1. The control section 6 comprises the phototransistor Q21 and the PWM control circuit 12.

The phototransistor Q21 supplies the voltage detection signal from the output voltage detecting section 5 to the control section 6, and its collector is connected to the PWM control circuit 12 while its emitter is connected to the other end of the capacitor C1. The phototransistor Q21 receives, at the base, the light that is emitted by the photodiode D11, and applies a collector voltage (collector-emitter voltage) corresponding to the amount of the received light to the PWM control circuit 12.

The PWM control circuit 12 controls the pulse width of the pulse signal to be supplied to the gate of the transistor Q1 according to the collector voltage of the phototransistor Q21, is supplied with a drive control voltage for generating the pulse signal and operates when the voltage level of the drive control voltage becomes equal to or greater than a predetermined level. The PWM control circuit 12 comprises, for example, a triangular voltage generating circuit, a signal level comparison circuit, and a pulse signal generating circuit (not shown). The triangular voltage generating circuit generates a triangular voltage, and the signal level comparison circuit compares the voltage level of the collector voltage of the phototransistor Q21 with the voltage level of the triangular voltage generated by the triangular voltage generating circuit. The pulse signal generating circuit generates the aforementioned PWM-controlled pulse signal based on the comparison result from the signal level comparison circuit.

The auxiliary power supply section 7 rectifies the voltage generated on the third winding n3 of the transformer T and supplies the voltage to the PWM control circuit 12, and includes a diode D12 for rectifying the voltage generated on the third winding n3. The anode of the diode D12 is connected to one end of the third winding n3, and the cathode is connected to one end of a capacitor C3 of the drive-control voltage supply section 8.

The drive-control voltage supply section 8, which supplies a constant current to the PWM control circuit 12 when the converter 1 is activated, comprises a switch 13, a constant current supply section 14, the capacitor C3, a load detecting circuit 15, a timer 16, and a switch control section (written as "SW control section" in the diagram) 17.

One end of the switch 13 is connected to one end of the capacitor C1, and one end of the constant current supply section 14 is connected to the other end of the switch 13. One end of the capacitor C3 is connected to the other end of the constant current supply section 14, and the other end of the capacitor C3 is connected to the other end of the capacitor C1. The switch 13 and the constant current supply section 14 charge the capacitor C3, and the switch 13 is controlled by the switch control section 17 to open and close the current supply path between the capacitor C1 and the constant current supply section 14.

The constant current supply section 14 transforms the current from the capacitor C1 to a constant current via the switch 13 and supplies the capacitor C3 with the current to the capacitor C3, thereby charging the capacitor C3.

the capacitor C3 is charged with the current supplied from the constant current supply section 14 or the auxiliary power supply section 7, and smoothes the drive control voltage to be applied to the PWM control circuit 12.

Figure 2:
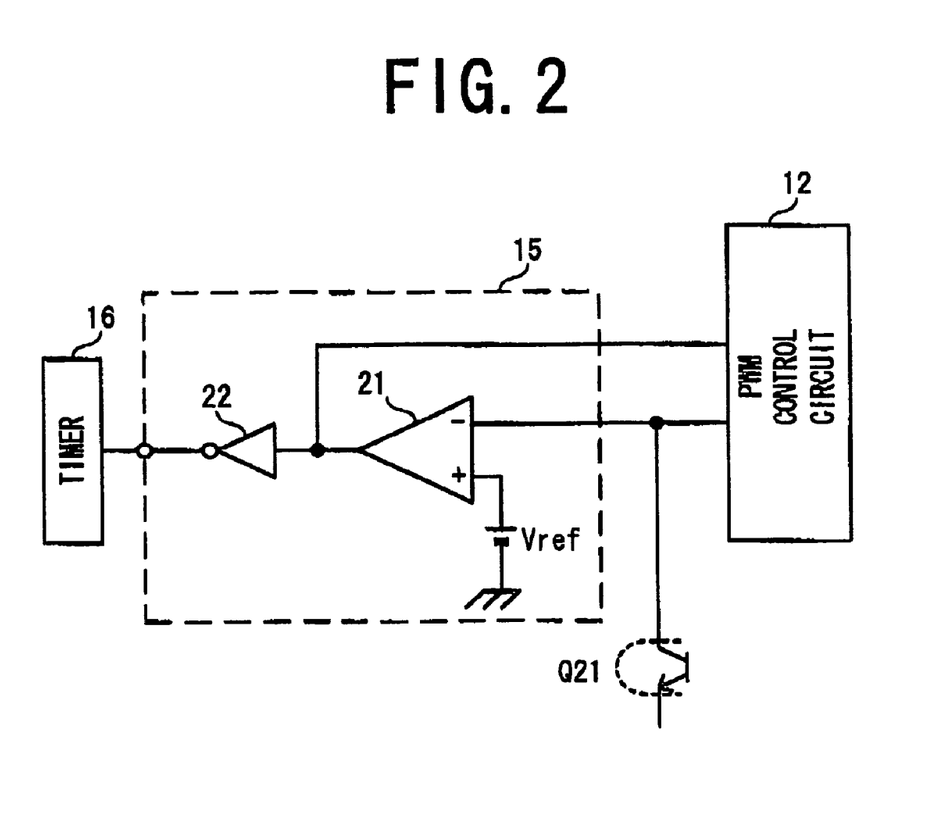
FIG. 2 is a circuit diagram showing the structure of a load detecting circuit in FIG. 1.

The load detecting circuit 15 discriminates the amount of a load connected between the output terminals Pout1 and Pout2 to detect a light load, and comprises a comparator 21 and an inverter 22 as shown in FIG. 2.

The inversion input terminal (−terminal) of the comparator 21 is connected to the collector of the phototransistor Q21. The non-inversion input terminal (+terminal) of the comparator 21 is supplied with a preset reference voltage Vref. The reference voltage Vref is a preset voltage for determining whether the load is light or not. The input terminal of the inverter 22 is connected to the output terminal of the comparator 21, and the output terminal of the inverter 22 is connected to the timer 16.

In a flyback converter, as the amount of load becomes lighter, i.e., as the output current is reduced, the output voltage rises and the collector voltage of the phototransistor Q21 drops. The comparator 21 supplies a low-level signal to the PWM control circuit 12 when the collector voltage of the phototransistor Q21 is equal to or higher than the reference voltage Vref, and decides that the load is light when the collector voltage of the phototransistor Q21 becomes lower than the reference voltage Vref, and supplies a high-level signal to the PWM control circuit 12.

The timer 16 measures the time since the load detecting circuit 15 has decided that the load is light, and supplies a switch-ON signal to set the switch 13 on to the switch control section 17 when a preset time elapses after the measuring. It is desirable that the preset time be one second or greater in order to considerably reduce power during standby.

The switch control section 17 controls the ON (close) and OFF (open) of the switch 13. The switch 13 is ON (closed) when the AC power supply 9 is powered on. When the voltage across the capacitor C3 exceeds the voltage that is so set as to set the switch 13 off, the switch control section 17 sets the switch 13 off to stop charging of the capacitor C3. When the switch-ON signal is supplied from the timer 16, the switch control section 17 sets the switch 13 on to resume charging.

The operation of the converter 1 according to the first embodiment will be discussed next.

Figure 3:
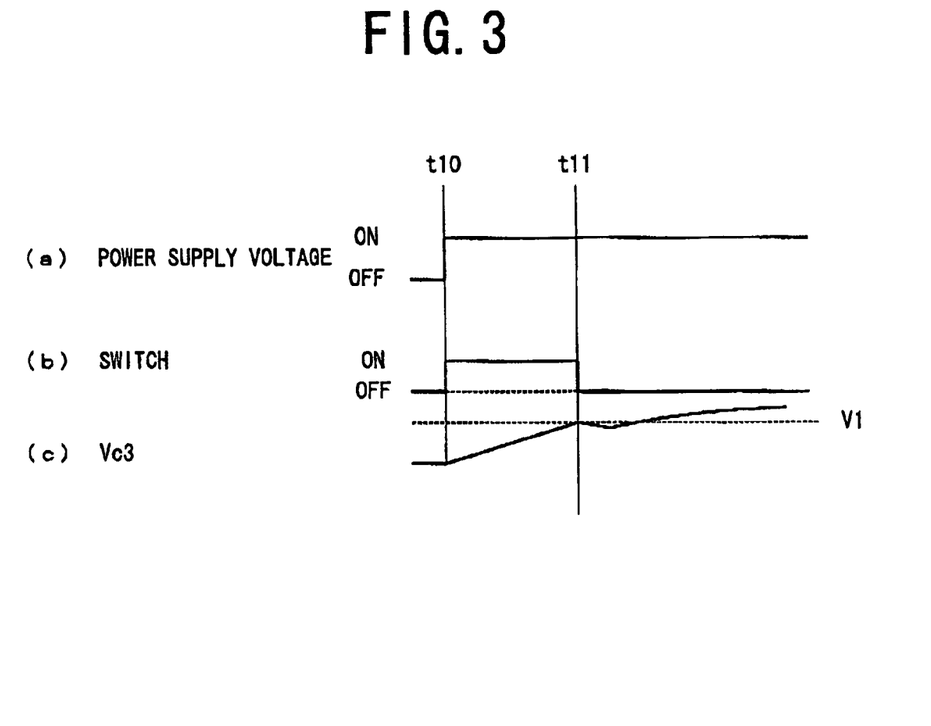
FIG. 3 is a timing chart illustrating the operation of the converter in FIG. 1 when AC power is given.

As shown in FIG. 3(a), when the AC power supply 9 is powered on at time t10, the switch 13 is set on (closed) at time t10 as shown in FIG. 3(b).

The rectifying circuit 11 rectifies an AC current from the AC power supply 9, and the capacitor C1 smoothes the rectified voltage rectified by the rectifying circuit 11.

The constant current supply section 14 is supplied with a DC current from the AC-DC converting section 2 via the switch 13 and supplies a constant current to the capacitor C3.

The capacitor C3 is charged with the supplied constant current, so that a voltage Vc3 across the capacitor C3 rises as shown in FIG. 3(c). In FIG. 3(c), a voltage V1 is an operation voltage at which the PWM control circuit 12 operates. When the voltage Vc3 of the capacitor C3 reaches the voltage V1 at time t11, the PWM control circuit 12 starts operating.

When the operation of the PWM control circuit 12 starts, the voltage Vc3 of the capacitor C3 temporarily drops, and rises again when the voltage is supplied to the capacitor C3 from the auxiliary power supply section 7 as shown in FIG. 3(c). The switch control section 17 opens the switch 13 at time t11 as shown in FIG. 3(b).

Figure 4:
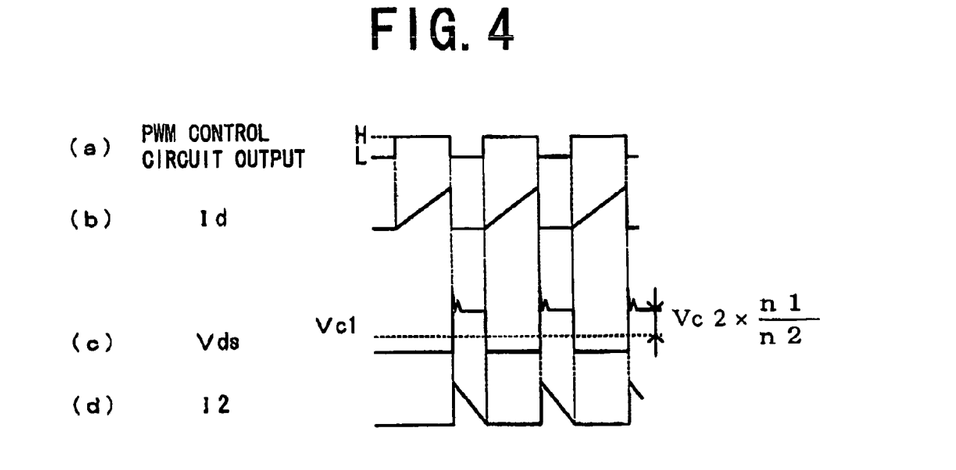
FIG. 4 is a timing chart illustrating the steady operation of the converter in FIG. 1.

When the operation starts, the PWM control circuit 12 supplies a pulse signal as shown in FIG. 4(a) to the gate of the transistor Q1. The transistor Q1 is turned on when the pulse signal supplied to the gate goes to a high level, and is turned off when the pulse signal goes to a low level.

When the transistor Q1 is turned on, a drain current Id as shown in FIG. 4(b) flows between the drain and source of the transistor Q1, and a drain voltage Vds which is applied between the drain and source of the transistor Q1 becomes nearly 0 as shown in FIG. 4(c).

When the transistor Q1 is turned off, the drain current Id becomes 0 as shown in FIG. 4(b), and the drain voltage Vds becomes a voltage Vc1 across the capacitor C1 added to the flyback voltage as shown in FIG. 4(c). Given that the voltage (output voltage) across the capacitor C2 is Vc2, the flyback voltage is expressed by Vc2×(n1/n2).

As the transistor Q1 is turned on or off, a voltage is generated on the third winding n3 of the transformer T, and the diode D12 of the auxiliary power supply section 7 rectifies the voltage generated on the third winding n3 and applies the rectified voltage to the capacitor C3.

On the secondary side of the transformer T, when the transistor Q1 is turned on, the voltage to be applied to the diode D1 becomes a backward voltage (the voltage of the cathode with respect to the anode being +), the diode D1 becomes non-conductive. Accordingly, the current does not flow in the secondary winding n2. Then, energy is stored in the transformer T.

When the transistor Q1 is turned off, the voltage to be applied to the diode D1 becomes a forward directional voltage (the voltage of the anode with respect to the cathode being +), the diode D1 conducts. As the diode D1 conducts, a current I2 as shown in FIG. 4(d) flows to the capacitor C2 via the diode D1 from the secondary winding n2 according to the energy stored in the transformer T.

The capacitor C2 is supplied with the current I2 and charged, and smoothes the voltage rectified by the diode D1. The converter 1 applies this DC voltage as an output voltage Vout to the load via the terminals Pout1 and Pout2. An output current Iout is supplied to the load.

When the output voltage Vout rises, the base current flows to the base of the transistor Q11 of the output voltage detecting section 5, a current flows between the collector and emitter of the transistor Q11, and a current flows in the photodiode D11 too. The current that flows between the collector and emitter of the transistor Q11 is controlled according to the voltage level of the output voltage Vout.

The photodiode D11 emits light with the amount of emission corresponding to the amount of the flowing current, and the phototransistor Q21 receives the light from the photodiode D11 as a voltage detection signal.

When the phototransistor Q21 receives the light from the photodiode D11, a current whose amount corresponds to the amount of the received light flows out between the collector and emitter of the transistor Q21, so that a collector voltage Vpc rises too.

The PWM control circuit 12 generates a pulse signal having a pulse width corresponding to the collector voltage Vpc, and supplies the pulse signal to the gate of the transistor Q1.

When the output current Iout decreases, the output voltage Vout rises and the collector voltage Vpc of the phototransistor Q21 drops.

Figure 5:
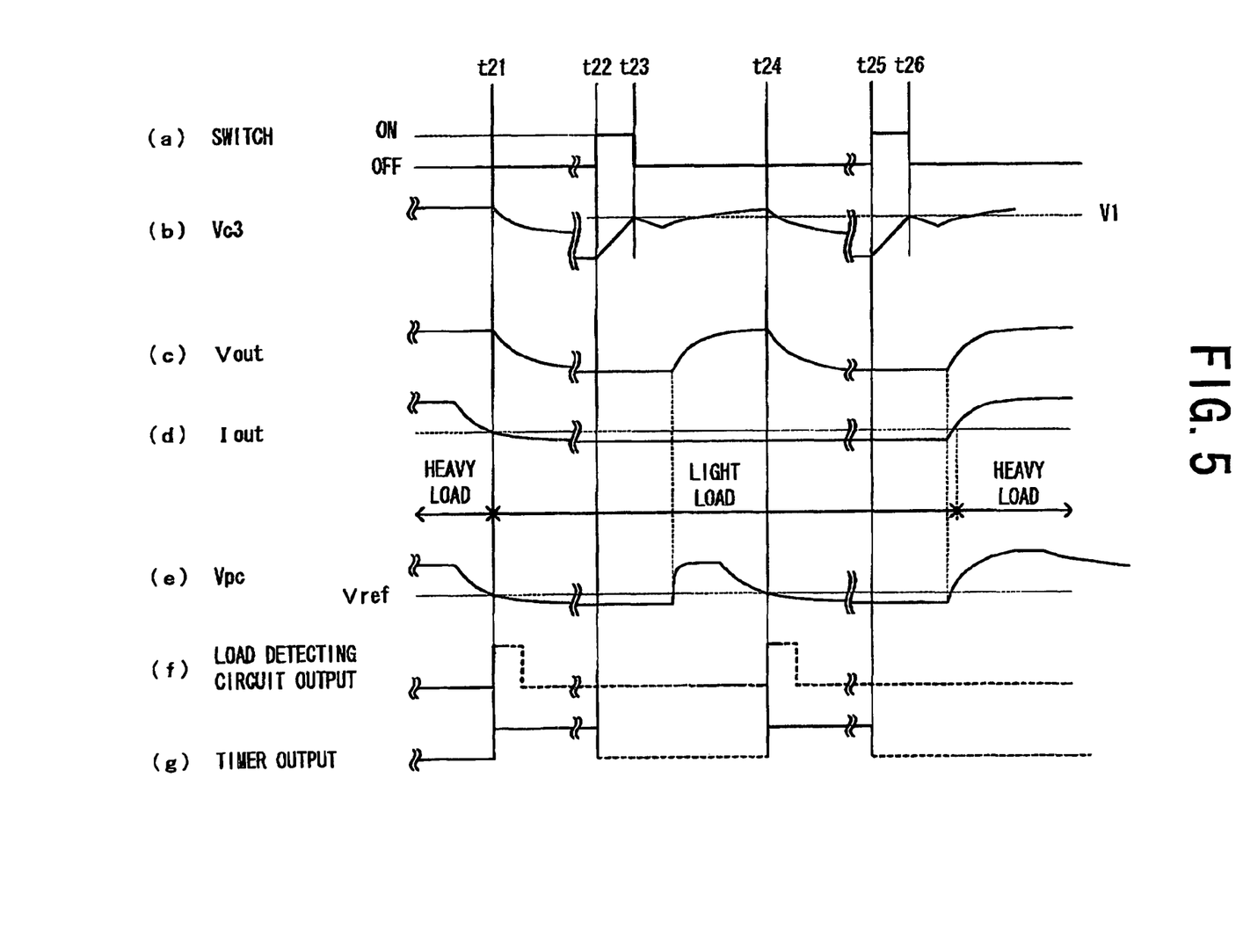
FIG. 5 is a timing chart illustrating the operation of the converter in FIG. 1 when a load is changed.

When the collector voltage Vpc becomes less than the reference voltage Vref of the comparator 21 of the load detecting circuit 15 at time t21 as shown in FIG. 5(e), the comparator 21 of the load detecting circuit 15 supplies a high-level signal to the PWM control circuit 12 as shown in FIG. 5(f). When the high-level signal is supplied from the comparator 21, the PWM control circuit 12 stops the operation.

When the operation of the PWM control circuit 12 stops, no voltage is applied to the primary winding n1 of the transformer T, so that the output voltage Vout drops as shown in FIG. 5(c) and the output current Iout becomes 0 as shown in FIG. 5(d). Further, as no voltage is generated on the third winding n3 of the transformer T and the switch 13 is off, the capacitor C3 is discharged, so that the voltage Vc3 of the capacitor C3 drops as shown in FIG. 5(b).

At time t21, the inverter 22 of the load detecting circuit 15 inverts the output signal of the comparator 21 and supplies a low-level signal to the timer 16.

When supplied with the low-level signal from the load detecting circuit 15, the timer 16 measures a predetermined time to time t22 as shown in FIG. 5(g). When the time becomes time t22, the timer 16 supplies the switch control section 17 a switch-ON signal to turn on the switch 13.

When supplied with the switch-ON signal, the switch control section 17 sets the switch 13 on. When the switch 13 is set on, the constant current supply section 14 supplies the constant current to the capacitor C3, so that the voltage Vc3 of the capacitor C3 rises again. When the voltage Vc3 becomes equal to or higher than the voltage V1, the PWM control circuit 12 starts operating, and at the same time, the switch control section 17 sets the switch 13 off.

When the output current Iout is little and the collector voltage Vpc of the phototransistor Q21 becomes lower than the reference voltage Vref at time t24 after the PWM control circuit 12 starts operating, as shown in FIGS. 5(d) and (e), the comparator 21 of the load detecting circuit 15 sends a high-level signal to the PWM control circuit 12 again. When supplied with the high-level signal, the PWM control circuit 12 stops the operation again.

The timer 16 measures the time from time t24, and supplies the switch-ON signal to the switch control section 17 when a predetermined time elapses to reach time t25. When supplied with the switch-ON signal, the switch control section 17 sets on the switch 13.

As the switch 13 is set on, the capacitor C3 is charged and the voltage Vc3 of the capacitor C3 becomes equal to or higher than the voltage V1, the PWM control circuit 12 starts operating again. At the same time, the switch control section 17 sets the switch 13 off. As the output current Iout increases and the collector voltage Vpc of the phototransistor Q21 becomes equal to or higher than the reference voltage Vref, the PWM control circuit 12 continues the operation.

According to the first embodiment, as described above, when the output current Iout decreases to achieve a light load, the load detecting circuit 15 stops the operation of the PWM control circuit 12, and a predetermined time measured by the timer 16 elapses, the switch control section 17 sets the switch 13 on, so that the voltage is applied to the PWM control circuit 12 again.

Therefore, the converter 1 can be activated automatically without a signal supplied from outside, and a standby loss can be made very small, As the operation of the PWM control circuit 12 stops for one second or longer, power during the standby can be reduced greatly. If the operation halt period of the PWM control circuit 12 is one second or so, there is no practical problem.

Second Embodiment

A converter according to the second embodiment is designed to use a resistor as the constant current supply section.

Figure 6:
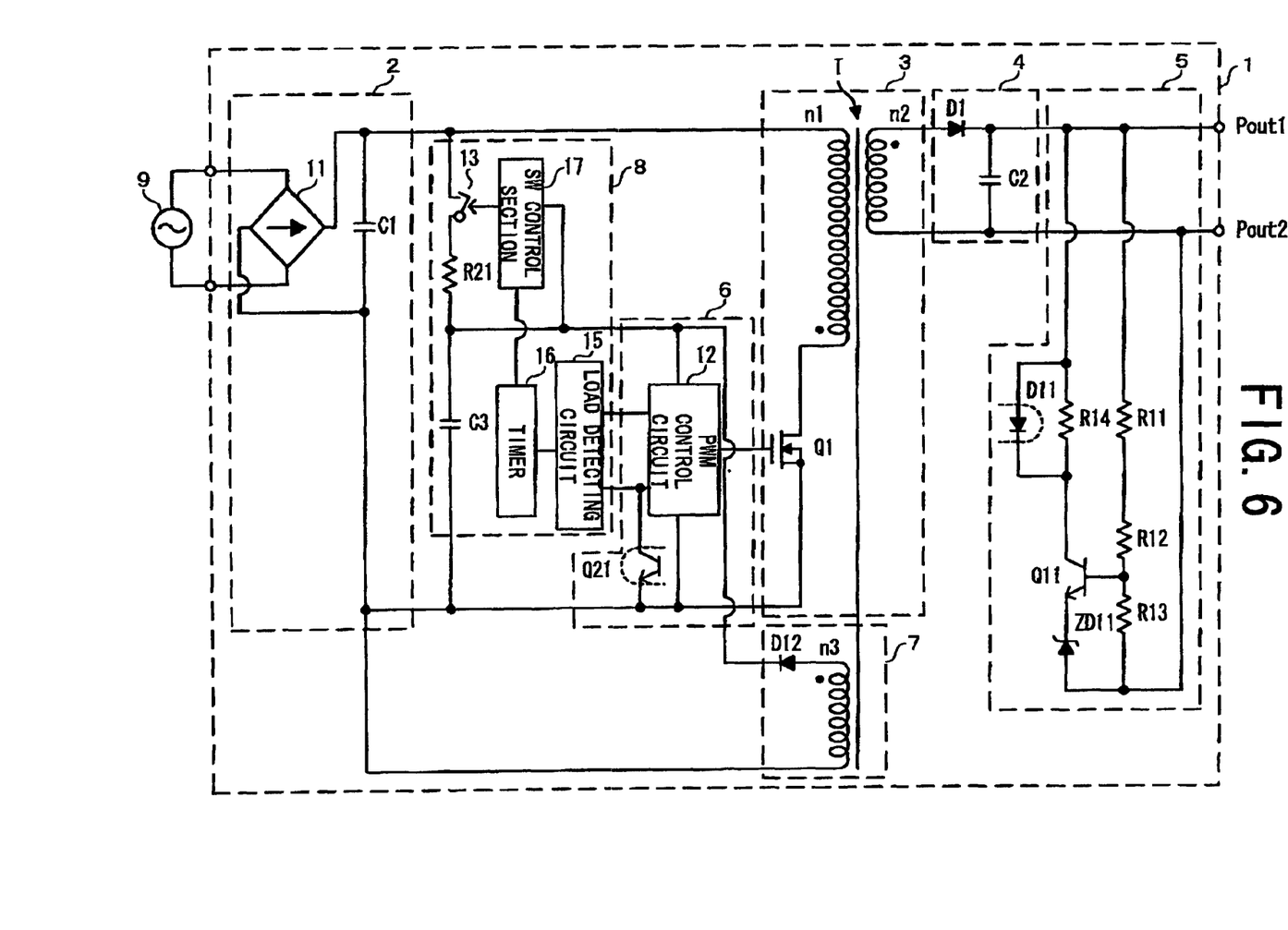
FIG. 6 is a circuit diagram showing the structure of a converter according to a second embodiment of the invention.

FIG. 6 shows the structure of a converter 1 according to the second embodiment.

As shown in FIG. 6, the converter 1 according to the second embodiment comprises a resistor R21 as the constant current supply section of the drive-control voltage supply section 8. One end of the resistor R21 is connected to the other end of the switch 13, while the other end of the resistor R21 is connected to one end of the capacitor C3.

When the constant current supply section 14 supplies the constant current to the capacitor C3 as in the converter 1 according to the first embodiment the constant current is supplied to the capacitor C3 regardless of the voltage level of the DC voltage that is supplied from the AC-DC converting section 2. Accordingly, the charging time of the capacitor C3 becomes constant.

With the resistor R21 provided instead of the constant current supply section 14 illustrated in the first embodiment, however, the current that flows across the resistor R21 increases when the voltage level of the DC voltage that is supplied from the AC-DC converting section 2 becomes higher, and the current that flows across the resistor R21 decreases when the voltage level of the DC voltage becomes lower. Therefore, the charging time of the capacitor C3 varies, so that the time from the powering of the AC power supply 9 to the activation of the PWM control circuit 12 can be changed according to the voltage level of the DC voltage.

Third Embodiment

Figure 7:
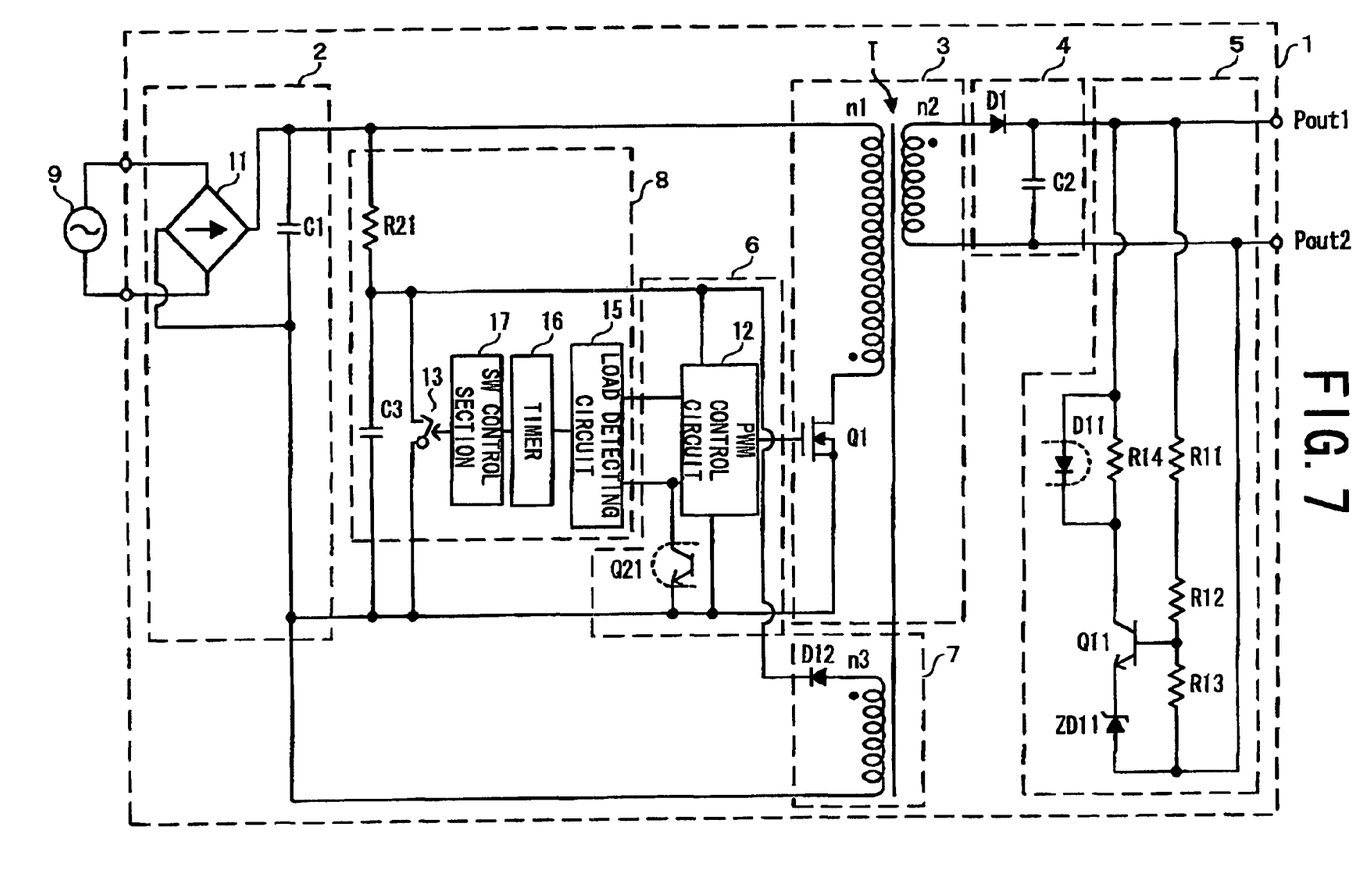
FIG. 7 is a circuit diagram showing the structure of a converter according to a third embodiment of the invention.

A converter 1 according to the third embodiment is constructed by connecting a switch to a capacitor in parallel in the drive-control voltage supply section.

FIG. 7 shows the structure of a converter 1 according to the third embodiment.

The converter 1 according to the third embodiment, like the converter 1 according to the second embodiment, has a resistor R21 in the drive-control voltage supply section 8. It is to be noted however that one end of the resistor R21 is connected to one end of the capacitor C1 of the AC-DC converting section 2, and one end of the switch 13 is connected to one end of the capacitor C3 while the other end of the switch 13 is connected to the other end of the capacitor C3.

The operation of the converter 1 according to the third embodiment will be described.

In the converter 1 according to the third embodiment, the switch 13 is off when the AC power supply 9 is powered on.

When the AC power supply 9 is powered on, the capacitor C3 is charged via the resistor R21. When the voltage Vc3 of the capacitor C3 becomes equal to or higher than the voltage V1, the PWM control circuit 12 starts operating.

When the operation of the PWM control circuit 12 starts, the output current Iout is supplied to the load. When the output current Iout decreases and the collector voltage Vpc of the phototransistor Q21 becomes lower than the reference voltage Vref, the load detecting circuit 15 stops the operation of the PWM control circuit 12 and activates the timer 16 at the same time.

The timer 16, when activated, measures the time. When activated, the timer 16 also outputs a switch-ON signal as a signal to instruct discharging to the switch control section 17. As the switch-ON signal is supplied to the switch control section 17 from the timer 16, the switch 13 is set on.

When the switch 13 is set on, the voltage of the capacitor C3 is discharged and the operation of the PWM control circuit 12 stops.

When a predetermined time elapses, the timer 16 stops supplying the switch-ON signal to the switch control section 17 and sends the switch control section 17 a switch-OFF signal to set the switch 13 off. When supplied with the switch-OFF signal from the timer 16, the switch control section 17 sets the switch 13 off.

When the switch 13 is set off, the capacitor C3 is charged again, and when the voltage Vc3 of the capacitor C3 becomes equal to or higher than the voltage V1, the PWM control circuit 12 starts operating.

According to the third embodiment, as described above, even if the switch 13 and the capacitor C3 are connected in parallel, the same effects as those of the converter 1 according to the first embodiment can be acquired.

The constant current supply section 14 may be provided instead of the resistor R21 as per the first embodiment Fourth Embodiment A converter according to the fourth embodiment is designed in such a way that the timer measures a predetermined time using the time constant of a capacitor.

Figure 8:
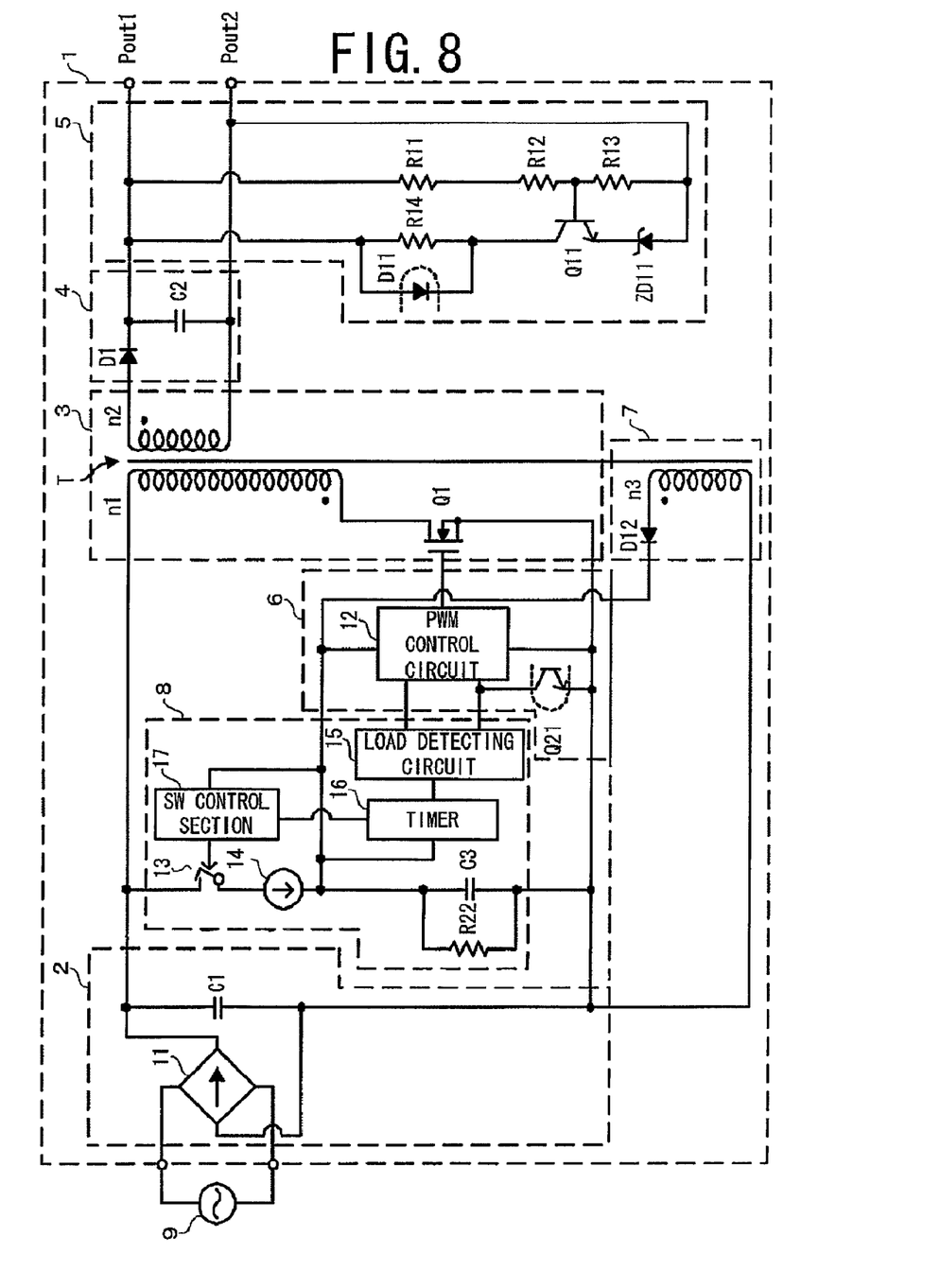
FIG. 8 is a circuit diagram showing the structure of a converter according to a fourth embodiment of the invention.

FIG. 8 shows the structure of a converter 1 according to the fourth embodiment The converter 1 according to the fourth embodiment is constructed by connecting a resistor R22 in parallel to the capacitor C3 of the drive-control voltage supply section 8.

One end of the resistor R22 is connected to one end of the capacitor C3, while the other end of the resistor R22 is connected to the other end of the capacitor C3. The discharge time constant of the resistor R22 and the capacitor C3 is determined according to their resistance and capacitance.

Figure 9:
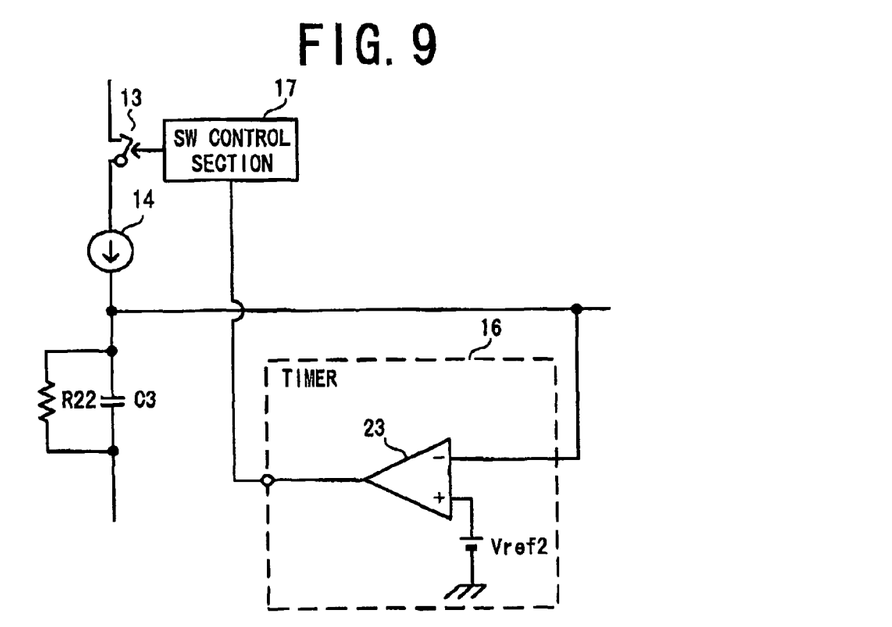
FIG. 9 is a circuit diagram showing the structure of a timer shown in FIG. 8.

The timer 16 has a comparator 23 as shown in FIG. 9. The inversion input terminal of the comparator 23 is connected to the node between the capacitor C3 and the resistor R22. A reference voltage Vref2 is supplied to the non-inversion input terminal of the comparator 23. The output terminal of the comparator 23 is connected to the switch control section 17.

The operation of the converter 1 according to the fourth embodiment will be described next.

In the converter 1 according to the fourth embodiment, the switch 13 is on when the AC power supply 9 is powered on.

When the AC power supply 9 is powered on and the voltage Vc3 of the capacitor C3 becomes equal to or higher than the voltage V1, the PWM control circuit 12 starts operating and the switch control section 17 sets the switch 13 off.

Figure 10:
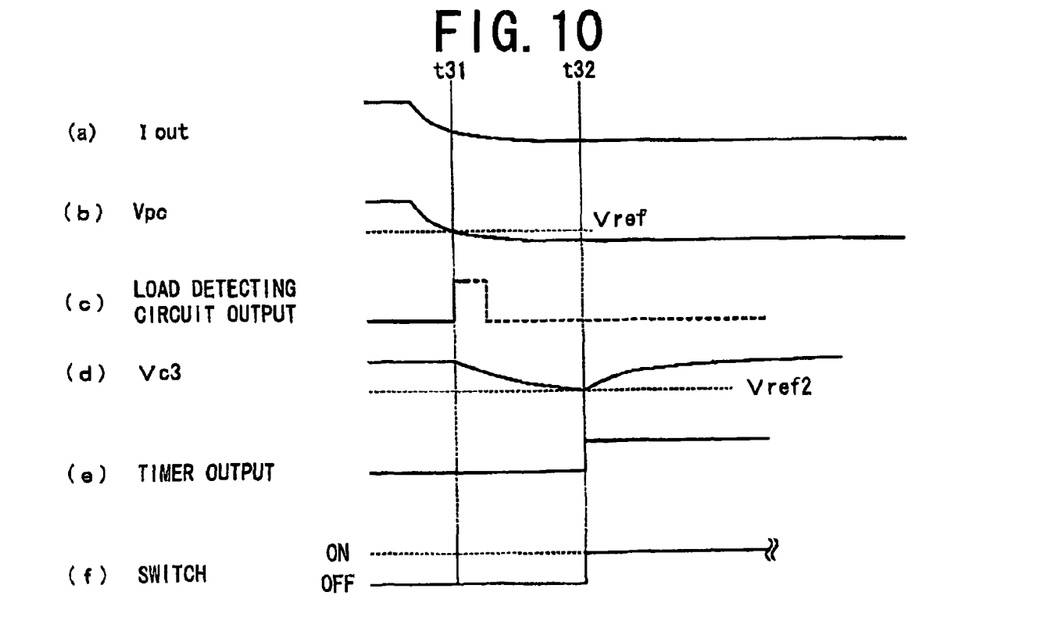
FIG. 10 is a timing chart illustrating the operation of the converter in FIG. 8.

When the output current Iout decreases and the collector voltage Vpc of the phototransistor Q21 becomes less than the reference voltage Vref of the comparator 21 shown in FIG. 2, as shown in FIGS. 10(a) to (c), the load detecting circuit 15 stops the operation of the PWM control circuit 12 at time t31.

When the operation of the PWM control circuit 12 stops, the voltage Vc3 of the capacitor C3 is discharged according to the time constant that is determined by the resistance of the resistor R22 and the capacitance of the capacitor C3 as shown in FIG. 10(d).

The comparator 23 of the timer 16 monitors the voltage Vc3 of the capacitor C3. At time t32 when the voltage Vc3 becomes equal to or lower than the reference voltage Vref2, the comparator 23 supplies a high-level output signal to the switch control section 17 as shown in FIG. 10(e).

When supplied with the high-level signal from the comparator 23, the switch control section 17 sets the switch 13 on as shown in FIG. 10(f). When the switch 13 is set on, the constant current supply section 14 supplies the constant current to the capacitor C3.

According to the fourth embodiment, as described above, by using the time constant of the capacitor C3 and the resistor R22, it is possible to measure a predetermined time from the point at which the operation of the PWM control circuit 12 has stopped to the point at which the switch 13 is set on.

In working out the invention, various modes are possible and the above-described embodiments are not restrictive.

Figure 11:
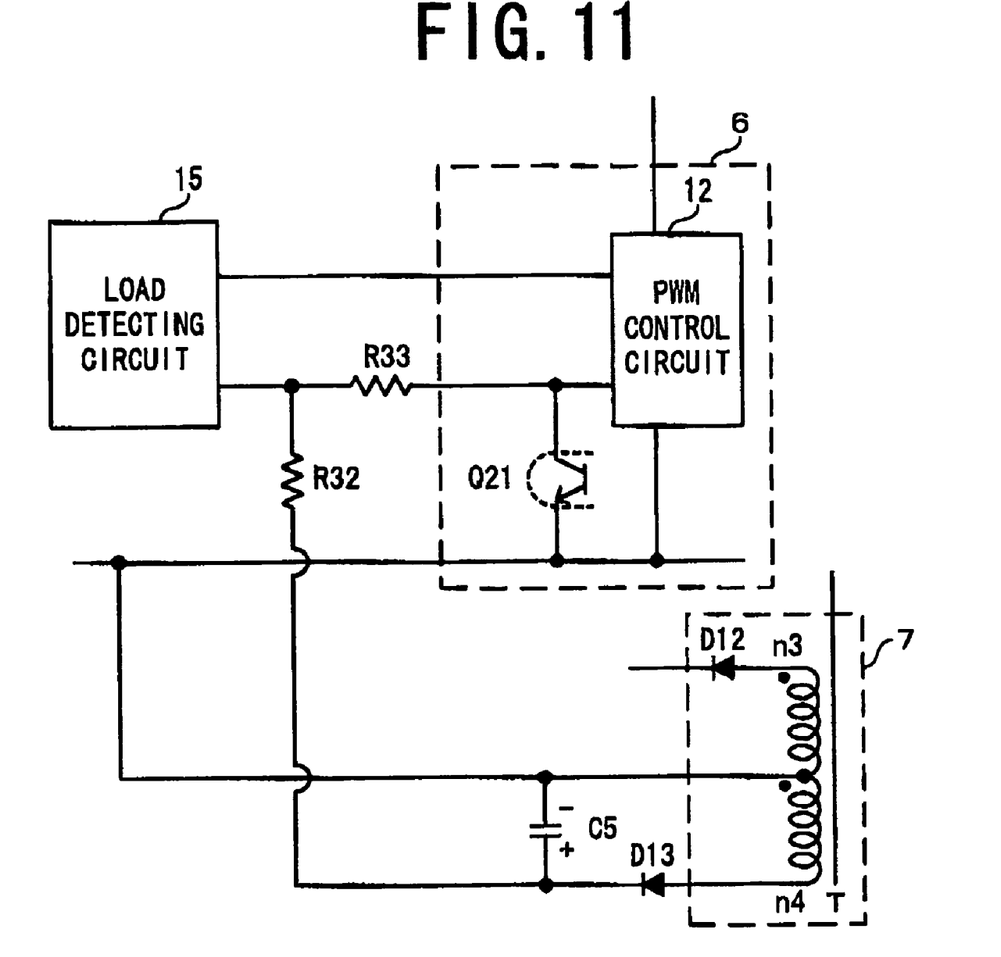
FIG. 11 is a circuit diagram showing the structure of a correction circuit which corrects the collector voltage of a phototransistor.

For example, it is possible to provide a circuit which corrects the collector voltage Vpc of the phototransistor Q21 as shown in FIG. 11. The correction circuit comprises a diode D13, a capacitor C5, and resistors R32 and R33. The transformer T has a fourth winding n4. One end of the fourth winding n4 is connected to the other end of the third winding n3. The fourth winding n4, like the third winding n3, is wound from one end to the other. The anode of the diode D13 is connected to the other end of the fourth winding n4 of the transformer T, and the cathode of the diode D13 is connected to the load detecting circuit 15 via the resistor R32. One end of the capacitor C5 is connected to the cathode of the diode D13, and the other end of the capacitor C5 is connected to the node between the third winding n3 and the fourth winding n4. The resistor R33 is connected between the load detecting circuit 15 and the collector of the phototransistor Q21.

The provision of the correction circuit with such a structure causes a positive voltage proportional to the voltage of the AC power supply 9 to be generated at one end of the capacitor C5. The correction circuit supplies the positive voltage to the collector of the phototransistor Q21.

When the collector of the phototransistor Q21 is directly connected to the load detecting circuit 15, as shown in FIG. 1, the decision level for a light load changes according to the voltage of the AC power supply 9. With the provision of the correction circuit, however, a change in the decision level for a light load becomes nearly 0. The correction circuit as shown in FIG. 11 is not restrictive as long as the structure generates a voltage proportional to the voltage of the AC power supply 9.

In each embodiment, the AC power supply 9 supplies an AC voltage. However, it may be a DC input, and if it is a DC input, the AC-DC converting section 2 need not be provided.

The load detecting circuit 15 may be provided on the secondary side, not only the primary side.

The drive-control voltage supply section 8 may be used in place of the auxiliary power supply section 7 to thereby omit the auxiliary power supply section 7. In this case, however, the structure should be such that the switch 13 is closed when the collector voltage Vpc of the phototransistor Q21 is lower than the voltage V1, and the switch 13 is opened when the collector voltage Vpc reaches the voltage V1. At this time, it is desirable that the voltage V1 should have a hysteresis.

The power supply is not limited to a flyback converter, but may be a forward converter, a push-pull converter or a bridge converter. Further, the power supply is not limited to such a switching regulator, but may be a series regulator or may supply the load with not only a DC voltage but also an AC voltage.

The present application is based on Japanese Patent Application No. 2003-274894 filed on Jul. 15, 2003. The present specification includes the specification, claims, drawings and abstract of the application.

INDUSTRIAL APPLICABILITY

The invention can be adapted to a power supply.

The invention claimed is:

1. A power supply comprising:
   a transformer (T) having a primary winding, a secondary winding and a third winding;
   a DC voltage input section (2) which receives an AC voltage and applies a DC voltage that is said input AC voltage rectified and smoothed to said primary winding of said transformer (T);
   a switching section (Q1) which generates a voltage on said primary winding of said transformer (T) by switching a current flowing in said primary winding of said transformer (T);
   a rectifying and smoothing section (4) which rectifies and smoothes a voltage generated on said secondary winding of said transformer (T), and supplies the rectified, smoothed voltage to said load,
   a drive control section (6) which supplies a pulse signal for said switching section (Q1) to switch said current to said switching section (Q1) as the drive signal, thereby driving and controlling said switching section (Q1);
   a capacitor (C3) which applies a charged voltage to a power line of said drive control section (6) as the drive control voltage;
   a charge circuit section (13, 14, R21) which supplies a current to said capacitor (C3) from said DC voltage input section (2) to charge said capacitor (C3) when said DC voltage input section (2) starts inputting a DC voltage to said primary winding of said transformer (T);
   an auxiliary power supply section (7) which rectifies a voltage generated on said third winding (n3) of said transformer (T) and applies that voltage to said capacitor (C3) to charge said capacitor (C3);
   a charge control section (17) which stops charging of said capacitor (C3) from said charge circuit section (13, 14, R21) when the drive control voltage to be supplied to said power line of said drive control section (6) becomes equal to or greater than a preset voltage value;
   an operation stop section (15) which detects an output current to be supplied to said load, compares a current value of said detected output current with a preset current value for determining whether said load is light or not, and stops an operation of said drive control section (6) when the current value of said detected output current becomes less than the preset current value for determining whether said load is light or not; and
   a time measuring section (16) which measures a time after said operation stop section (15) stops the operation of said drive control section (6), and outputs a switch-on signal to said charge control section (17) when a preset time elapses since measuring, wherein said charge control section (17) resumes charging said capacitor from said charging circuit when said switch-on signal is output from said time measuring unit (16).

2. The power supply according to claim 1, wherein said charge circuit section is constituted by inserting, between said DC voltage input section (2) and one end of said capacitor (C3):
   a constant current supply section (14) which supplies a constant current to said capacitor (C3); and
   a switch (13) which is closed when said DC voltage input section starts inputting the DC voltage to said primary winding of said transformer.

3. The power supply according to claim 1, wherein said charge circuit section is constituted by inserting, between said DC voltage input section (2) and one end of said capacitor (C3):
   a resistor (R21); and
   a switch (13) which is closed at a time of activation when said DC voltage input section (2) starts inputting the DC voltage to said primary winding of said transformer (T).

4. The power supply according to claim 2, wherein said charge control section comprises a switch control section (17) which stops charging of said capacitor (C3) from said charge circuit section (13, 14, R21), and
   said time measuring section (16) measures a time after said operation stop section (15) stops the operation of said drive control section (6), and outputs a switch-ON signal to close said switch (13) to said switch control section (17) when a preset time elapses since measuring.

5. The power supply according to claim 1, wherein a resistor (R22) is connected to both ends of said capacitor (C3), and
   said time measuring section (16) considers that the preset time has elapsed when a voltage across said capacitor (C3) becomes equal to or lower than a predetermined value after said operation stop section (15) has stopped the operation of said drive control section (6), and outputs said switch-on signal to said charge control section (17).

6. A power supply comprising:
   a transformer (T) having a primary winding, a secondary winding and a third winding;
   a DC voltage input section (2) which receives an AC voltage and applies a DC voltage that is said input AC voltage rectified and smoothed to said primary winding of said transformer (T);
   a switching section (Q1) which generates a voltage on said primary winding of said transformer (T) by switching a current flowing in said primary winding of said transformer (T);
   a rectifying and smoothing section (4) which rectifies and smoothes a voltage generated on said secondary winding of said transformer (T), and supplies the rectified, smoothed voltage to said load,
   a drive control section (6) which supplies a pulse signal for said switching section (Q1) to switch said current to said switching section (Q1) as the drive signal, thereby driving and controlling said switching section (Q1)
   a capacitor (C3) which applies a charged voltage to a power line of said drive control section (6) as the drive control voltage;
   a charge circuit section (14, R21) which supplies a current to said capacitor (C3) from said DC voltage input section (2) to charge said capacitor wherein said DC voltage input section (2) starts inputting a DC voltage to said primary winding of said transformer (T);
   an auxiliary power supply section (7) which rectifies a voltage generated on said third winding (n3) of said transformer (T) and applies the rectified voltage to said capacitor (C3) to charge said capacitor (C3);
   an operation stop section (15) which detects an output current to be supplied to said load, compares a current value of said detected output current with a preset current value for determining whether said load is light or not, and stops an operation of said drive control section (6) when the current value of said detected output current becomes less than the preset current value for determining whether said load is light or not;

a discharge control section (13, 17) which discharges a voltage of said capacitor (C3) when a discharge instruction signal is supplied; and a time measuring section (16) which supplies said discharge instruction signal to said discharge control section (13, 17) when said operation stop section (15) stops an operation of said drive control section (6), and stops supplying the discharge instruction signal to said discharge control section (13, 17) when a preset time elapses after time measuring wherein said discharge control unit (13, 17) causes said capacitor (C3) to discharge during the supply of the discharge signal from said time measuring section (16), and then causes the charge circuit section (14R, R21) to restart charging to said capacitor (C3).

7. The power supply according to claim 6, wherein said charge circuit section comprises a current supply section (14) which supplies a current to said capacitor (C3), and said discharge control section comprises:

a switch (13) which is open at a time of activation when said DC voltage input section (2) starts inputting the DC voltage to said primary winding of said transformer (T); and a switch control section (17) which closes said switch (13) to discharge the voltage of said capacitor (C3), when said operation stop section (15) stops the operation of said drive control section (6).

8. The power supply according to claim 6, wherein said charge circuit section comprises a resistor (R21) inserted between said DC voltage input section (2) and said capacitor (C3), and said discharge control section comprises:

a switch (13) which is open when said DC voltage input section (2) starts inputting the DC voltage to said primary winding of said transformer (T); and a switch control section (17) which closes said switch (13) to discharge the voltage of said capacitor (C3), when said operation stop section (15) stops the operation of said drive control section (6).

9. A controlling method for a power supply including a voltage generating section (2, 3, 4) which generates an output voltage to be supplied to a load in accordance with a drive signal, and a drive control section (6) which is activated upon a drive control voltage being applied to a power supply line and said drive control voltage exceeding a preset value, generates said drive control signal in accordance with a signal indicating the output voltage and supplies said generated drive signal to said voltage generating section (2, 3, 4) to drive said voltage generating section (2, 3, 4) to supply the output voltage to the load, wherein upon startup of said power supply, said drive control voltage is applied to said power supply line of said drive control section (6) to activate said drive control section (6) to supply the output voltage to said load from said voltage generating section (2, 3, 4), a current flowing in the load is monitored, generation of said drive signal by said drive control section (6) is stopped and by lowering said drive control voltage, operation of said drive control section (6) is stopped when said current becomes less than a preset current value, and after a predetermined time elapses since stopping of the operation of said drive control section, said drive control voltage is raised to reactivate said drive control section (6).

* * * * *